(12) United States Patent
Kurashina (10) Patent No.: US 7,249,902 B2
(45) Date of Patent: Jul. 31, 2007

(54) TAPE PRINTING APPARATUS AND TAPE PRINTING METHOD

(75) Inventor: Hiroyasu Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 389 days.

(21) Appl. No.: 11/028,012

(22) Filed: Jan. 3, 2005

(65) Prior Publication Data

US 2005/0180795 A1    Aug. 18, 2005

(30) Foreign Application Priority Data

Feb. 12, 2004    (JP)    ............... 2004-035664

(51) Int. Cl.
*B41J 11/00*    (2006.01)
*B41J 15/00*    (2006.01)

(52) U.S. Cl. .................... 400/611; 400/613.2
(58) Field of Classification Search ............... 400/611, 400/613, 615.2
See application file for complete search history.

(56) References Cited

U.S. PATENT DOCUMENTS 5,562,353 A * 10/1996 Handa et al. ............ 400/615.2

5,795,086 A    8/1998 Watanabe et al.

FOREIGN PATENT DOCUMENTS

| CN | 1081990 C | 4/2002 |
|---|---|---|
| JP | 07-061100 | 3/1995 |
| JP | 10-217550 | 8/1998 |
| JP | 2001-088358 A | 4/2001 |
| JP | 2002-240356 A | 8/2002 |
| JP | 2003089242 | * 3/2003 |

OTHER PUBLICATIONS

Chinese Language Office Action for corresponding Chinese Application No. 2004 100988690 lists the references above.

* cited by examiner

*Primary Examiner*—Daniel J. Colilla
*Assistant Examiner*—Marissa Ferguson-Samreth
(74) *Attorney, Agent, or Firm*—Hogan & Hartson LLP (57) ABSTRACT

There is provided a tape printing apparatus in which characters to be printed on a recording face of a recording tape layer of a print tape are inputted, and a folding-line position of a pseudo-laminate layer of the print tape is defined. A print-width range on a recording face is defined based on the defined folding-line position to print the characters therein.

13 Claims, 12 Drawing Sheets

⟨1. NO AUXILIARY LINE PROVIDED⟩

FIG. 8A

⟨2. FOLDING LINE PROVIDED⟩

FIG. 8B

⟨3. FOLDING POINT PROVIDED⟩

FIG. 8C

⟨4. ALIGNMENT POINT PROVIDED⟩

TAPE PRINTING APPARATUS AND TAPE PRINTING METHOD

BACKGROUND OF THE INVENTION

1. Field of the Invention

The present invention relates to a tape printing apparatus and a tape printing method in which printing is performed by the use of a print tape partially serving as a laminate tape.

2. Description of the Related Art

Conventional tape cartridges include: a type in which a print tape and an ink ribbon are accommodated in a cartridge casing and freely reeled out therefrom; and a type in which a print tape, a laminate tape, and an ink ribbon are accommodated in a cartridge casing and freely reeled out therefrom. These two types of tape cartridges are put into their dedicated tape printing apparatuses. In the former case, a print tape is printed and then cut off to form a label, and in the latter case, a print tape is printed and bonded with a laminate tape prior to cutting thereof to form a laminated label.

Note that the tape printing apparatus in the latter case enables to form non-laminated labels with a tape cartridge not dedicated to lamination being inserted thereto. The tape printing apparatus in the former case, however, does not enable to form laminated labels even with a tape cartridge additionally accommodating a laminate tape being inserted thereto, since the apparatus has no mechanism of bonding a print tape and a laminate tape together.

Accordingly, in the case of the printing apparatus which has no mechanism of bonding a print tape and a laminate tape together, it is thought possible to form a print tape serving as a laminate tape by performing printing using a print tape laminated with a recording tape for printing and a laminating transparent tape and then folding the transparent tape thereon. However, since the transparent tape is folded after the print tape is printed, there may arise a case where the print face is not fully laminated or printed characters are only partially folded depending on the position of folding involved.

SUMMARY OF THE INVENTION

In view of the above problem, it is an advantage of the present invention to provide a tape printing apparatus and a tape printing method in which characters can be properly printed based on a defined folding position in a tape-width direction.

According to one aspect of the present invention, there is provided a tape printing apparatus for performing printing on a print tape which includes: a recording tape layer formed of a print recording piece in one substantially half-part whose front face serves as a recording face and of a separating piece in the other substantially half-part, both of which are divided by a front cut-line formed at an intermediate position in a tape-width direction; and a transparent pseudo-laminate layer affixed to a rear face of the recording tape layer and having a laminating adhesive layer on a front-face side thereof and a transparent tape layer on a rear-face side thereof, wherein the separating-piece side of the pseudo-laminate layer is allowed to serve as a laminate tape for the recording face when folded and affixed to the front face of the print recording piece after separation of the separating piece. The tape printing apparatus comprises: an inputting means for inputting a character to be printed on the recording face; a folding-line defining means for defining a folding-line position of the pseudo-laminate layer; a width-range defining means for defining a print-width range of the recording face based on the defined folding-line position; and a printing means for printing the character in the defined print-width range.

According to another aspect of the present invention, there is provided a tape printing method in a tape printing apparatus for performing printing on a print tape which includes: a recording tape layer formed of a print recording piece in one substantially half-part whose front face serves as a recording face and of a separating piece in the other substantially half-part, both of which are divided by a front cut-line formed at an intermediate position in a tape-width direction; and a transparent pseudo-laminate layer affixed to a rear face of the recording tape layer and having a laminating adhesive layer on a front-face side thereof and a transparent tape layer on a rear-face side thereof, wherein the separating-piece side of the pseudo-laminate layer is allowed to serve as a laminate tape for the recording face when folded and affixed to the front face of the print recording piece after separation of the separating piece. The tape printing method comprises: an inputting step of inputting a character to be printed on the recording face; a folding-line defining step of defining a folding-line position of the pseudo-laminate layer; a width-range defining step of defining a print-width range of the recording face based on the defined folding-line position; and a printing step of printing the character in the defined print-width range.

According to this configuration, since the print-width range is defined based on the defined folding-line position of the pseudo-laminate layer and characters are printed therein, it is possible to prevent the characters from being partially printed on a non-laminated part or prevent the printed characters from being only partially folded in forming a print tape serving as a laminate tape with an attractive appearance. Further, it is possible to finely adjust the tape width of the folded print tape by shifting the folding position back and forth in the tape-width direction rather than the intermediate position thereof in the tape-width direction.

Preferably, the print tape is allowed to constitute: a normal folding in which the tape width of a folded tape is one-half of the tape width of a pre-folded tape; an insufficient folding in which the tape width of a folded tape is greater than one-half of the tape width of a pre-folded tape; and a rear-face wind folding in which the tape width of a folded tape is smaller than one-half of the tape width of a pre-folded tape. The folding-line defining means defines the folding-line position of the pseudo-laminate layer based on the designated tape width of the folded tape.

According to this configuration, as compared to the normal folding in which the tape width of a folded tape is one-half of the tape width of a pre-folded tape, the insufficient folding makes the tape width of a folded tape slightly wider, while the rear-face wind folding makes the tape width of a folded tape slightly shorter. Further, the folding-line position can be defined after the user designates a desired tape width, since it is to be defined based on the tape width of the folded tape.

Note that the "normal folding" herein refers to a case where a folding piece is folded at an intermediate position in a tape-width direction as a folding position in such a manner as to suitably cover a folded piece. Further, the "insufficient folding" refers to a case where a folding piece is folded at a folding-piece side (away from an intermediate position in a tape-width direction) as a folding position such that a folded piece remains partially exposed. Furthermore, the "rear-face wind folding" refers to a case where a folding piece is folded at a folded-piece side (away from an intermediate position in a tape-width direction) as a folding position such that some (including an end) of a folding piece is folded and wound onto the rear face of a folded piece.

Preferably, when the folding-line position causing the insufficient folding is defined, the printing means prints on the recording face not only characters but also end marks indicative of the end of the folded pseudo-laminate layer.

According to this configuration, the end marks are printed at the position with which the end of the folded pseudo-laminate layer is aligned, thus allowing the user to easily form a print tape serving as a laminate tape having a desired width by folding the separating-piece side of the pseudo-laminate layer in alignment with the end marks.

Preferably, the end marks are composed of dots printed away from the characters.

According to this configuration, the end marks do not overlap with the printed characters and are inconspicuous, thus preventing the appearance of the tape from being deteriorated.

Preferably, when the folding-line position causing the insufficient folding is defined, the printing means prints on the front face of the separating piece not only characters but also a folding-line mark indicative of the folding-line position.

Preferably, when the folding-line position causing the rear-face wind folding is defined, the printing means prints on the recording face not only characters but also a folding-line mark indicative of the folding-line position.

According to this configuration, the folding-line mark is printed at the folding-line position when the pseudo-laminate layer is folded, thus allowing the user to easily form a print tape serving as a laminate tape having a desired width by folding the separating-piece side of the laminate layer in alignment with the mark. Further, the folding-line mark disappears after the separating piece is separated. Alternatively, some part of the folded pseudo-laminate layer may put it out of the user's sight.

Preferably, the folding-line mark is composed of a line extending in a traveling direction of the print tape.

According to this configuration, the line is printed at the folding-line position, thus allowing the user to easily form a print tape serving as a laminate tape having a desired width by folding the separating-piece side of the laminate layer in alignment with the line.

Preferably, when the folding-line position causing the insufficient folding is defined, the width-range defining means defines as the print-width range the area between the cut-line position and the end of the folded pseudo-laminate layer.

According to this configuration, since the area between the cut-line position and the end of the folded pseudo-laminate layer is defined as the print-width range, even in the case of the insufficient folding where the print-recording piece is not partially laminated after the separating-piece side of the laminate layer is folded, the non-laminated part is not subjected to printing. Accordingly, it enables protection of the printed characters with a reliable lamination.

Preferably, when the folding-line position causing the rear-face wind folding is defined, the width-range defining means defines as the print-width range the area between the end of the print recording piece around which the pseudo-laminate layer turns and the folding base of the folded print recording piece.

According to this configuration, the area between the end of the print recording piece around which the pseudo-laminate layer turns and the folding base of the folded print recording piece is defined as the print-width range in the folded print tape. Accordingly, even in the case of the rear-face wind folding where the folding-line position is defined in the print-recording piece side, the part of the print-recording piece to be wound onto the rear face is not subjected to printing. As a result, characters do not disappear out of the user's sight after the separating-piece side of the pseudo-laminate layer is folded.

Preferably, a size-defining means for defining a print size of characters in conformity with the print-width range is further provided.

According to this configuration, since the print size is defined in conformity with the print-width range, it is possible to save labor of defining the size and form a print tape serving as a laminate tape with an attractive appearance.

Preferably, the printing means prints on the separating piece an operating instruction for a laminate operation.

Preferably, the operating instruction includes an instruction for performing a folding operation prior to a separating operation.

According to the configuration, the user will be able to easily form a print tape serving as a laminate tape, without making an erroneous separating or folding operation.

BRIEF DESCRIPTION OF THE DRAWINGS

The above and other objects and the attendant features of the present invention will become readily apparent by reference to the following detailed description when considered in conjunction with the accompanying drawings wherein.

DETAILED DESCRIPTION OF THE PREFERRED EMBODIMENTS

Hereinafter, a tape printing apparatus and a tape printing method according to an embodiment of the present invention will be specifically described with reference to the accompanying drawings.

Figure 1:
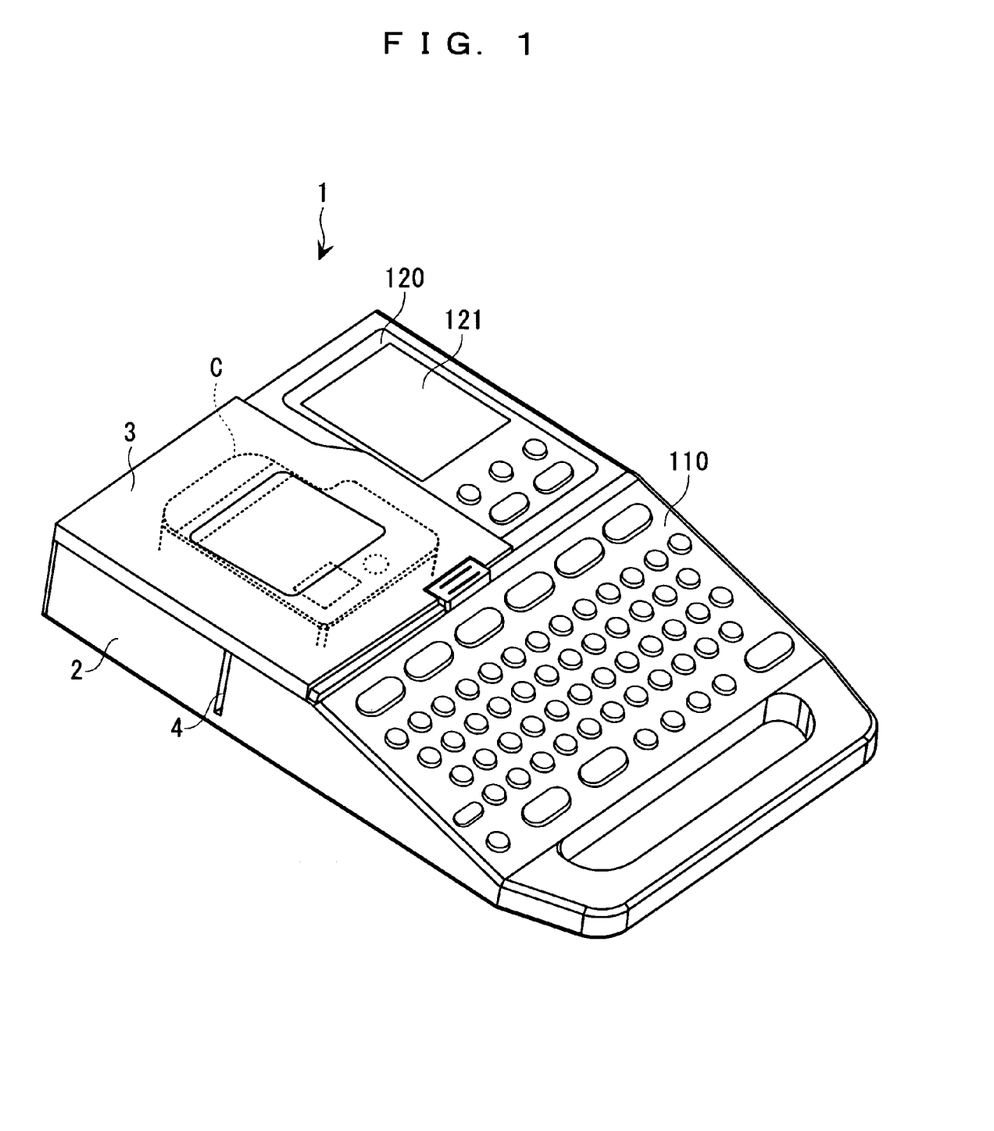
FIG. 1 is an external perspective view of a tape printing apparatus according to an embodiment of the present invention.
Figure 2:
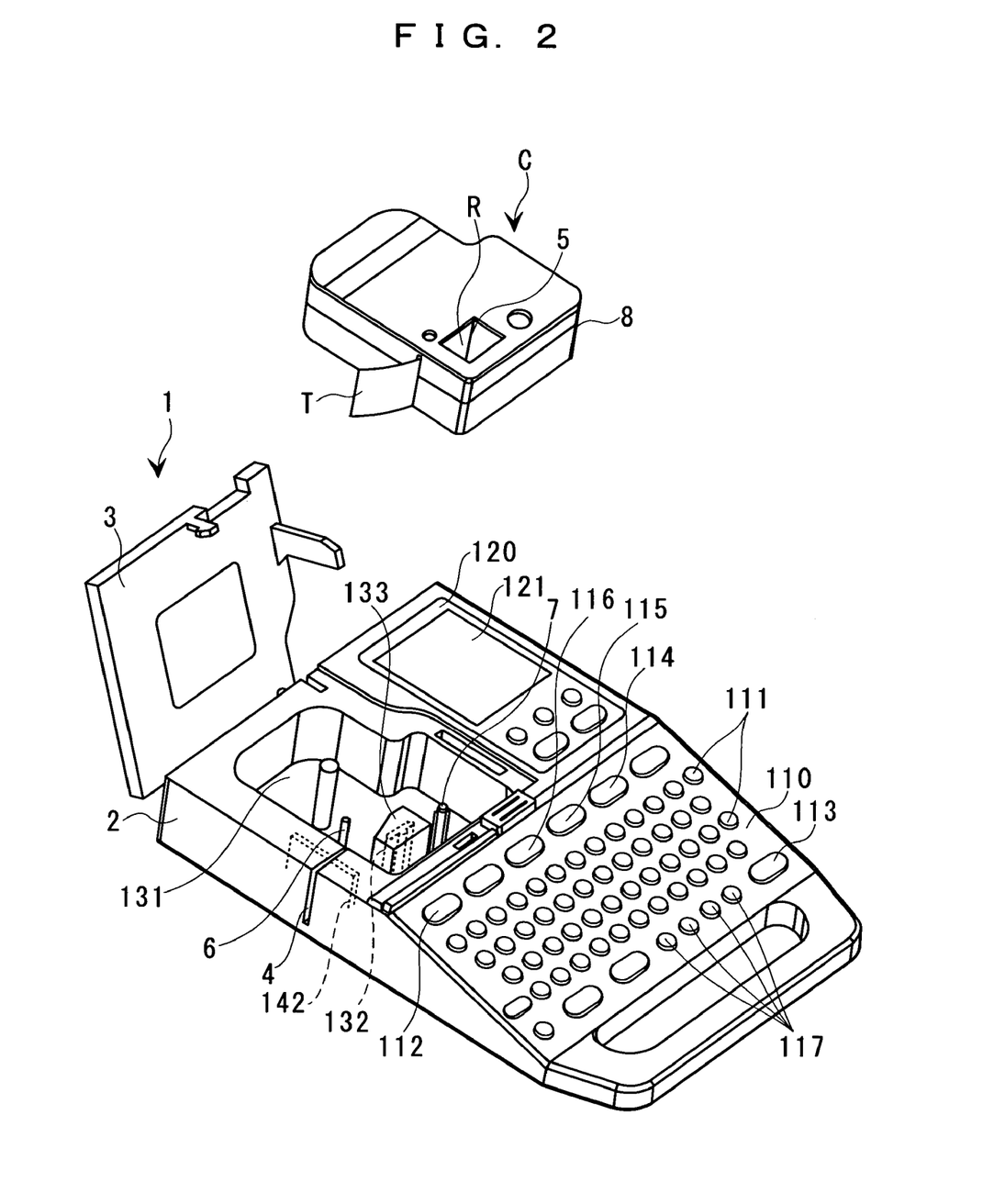
FIG. 2 is a perspective view of the tape printing apparatus of FIG. 1 with its cover opened.

First, description of an entire configuration of the tape printing apparatus 1 of the present invention will be made below. As shown in FIGS. 1 and 2, the tape printing apparatus 1 has an outer shell thereof formed by an apparatus casing 2, and a keyboard 110 composed of various input keys on the front top face of the apparatus casing 2. Further, on the left side of the rear top face is provided an opening/closing cover 3, and a display 120 is arranged on the right side thereof.

The keyboard 110 is provided with a characters key-group 111 including an alphabet key-group, a numeral key-group, a kana key-group including hiragana and katakana characters, an external characters key-group for calling and selecting external characters, etc., as well as a function key-group for setting various operation modes. The function key-group includes: a print key 112 for directing a print operation; a select key 113 for data confirmation and line feed when characters are inputted and for selecting and directing various modes on a selection screen; a file-form key 114 for operating files and selecting print formats; a character-mode key 115 for directing the typeface and decoration of characters, or the like; a paragraph-style key 116 for directing the size and layout of characters; and four cursor keys 117 for moving a cursor from right to left or up and down and a display range of a display screen 121, etc.

Inside the opening/closing cover 3 is formed a pocket 131 into which a tape cartridge C is to be fit. The tape cartridge C is attached/detached to and from the pocket 131 with the cover 3 opened. The tape cartridge C has a cartridge casing 8 in which a tape T having a uniform width (ranging approximately from 4.5 mm to 48 mm) and an ink ribbon R are accommodated. Besides, the tape cartridge C has a through hole 5 into which a print head 132 composed of a thermal head 132 is to be fit.

Further, the tape cartridge C has the rear face thereof provided with a plurality of small holes for identifying the type of print tapes T (hereinafter simply referred to as "tape"), each having a different tape width. The pocket 131 is provided with a tape-identifying sensor 152 (see FIG. 3) such as a micro switch for detecting presence or absence of such holes. Accordingly, it is made possible to detect presence or absence of the tape T (more specifically, whether or not the tape cartridge C has been fit) and the type of the tape T (more specifically, the type of the tape cartridge C). The tape T has a configuration in which a recording tape layer 10 whose front face is to be printed as a recording face and a pseudo-laminate layer 20 for lamination are laminated to each other (see FIG. 4A). Note that the detailed description of the tape T will be made hereinafter. The tape T and the ink ribbon R travel in an overlapped state at the through hole 5, and only the printed part of the tape T is delivered to the outside while the ink ribbon R is to be rewound in the tape cartridge C.

The head unit 133 includes a print head 132 with a cover therefor. With the tape cartridge C fit, the print head 132 is brought into contact with the rear face of the ink ribbon R exposed at the through hole 5. The print head is then thermally driven to print desired characters on the front face of the tape T. In the pocket 131 are provided a platen driving shaft 6 and a ribbon rewind driving shaft 7 with which driven parts of the fit tape cartridge C engage. Accordingly, the tape T and the ink ribbon R in the tape cartridge C are to be fed by the use of a feed motor 134a (see FIG. 3) as a driving source, and the print head 132 is driven in synchronism therewith to perform printing. Further, at a tape-delivering port 4 is arranged a tape cutter 142 for cutting off the tape T, and after the printing is completed, the tape T is to be fed to the tape-delivering port 4 such that the cutting position thereof aligns with the tape cutter 142.

In the case of the tape printing apparatus 1, the user fits the tape cartridge C into the pocket 131, and then inputs print information such as desired characters (texts, numerals, symbols, characters like simple graphics) with the keyboard 110 while viewing and confirming input and edit results through the display 120 to direct printing. Subsequently, a tape-feeding section 134 (see FIG. 3) allows the tape T to be fed from the tape cartridge C, and the tape T is then printed by the print head 132 as required. The printed part of the tape T is fed to the outside from the tape-delivering port 4. When the desired printing is completed, the tape-feeding section 134 feeds the tape T in such a manner as to reach the position thereof including the margin in the tape length, and then stops the feeding thereof.

Figure 3:
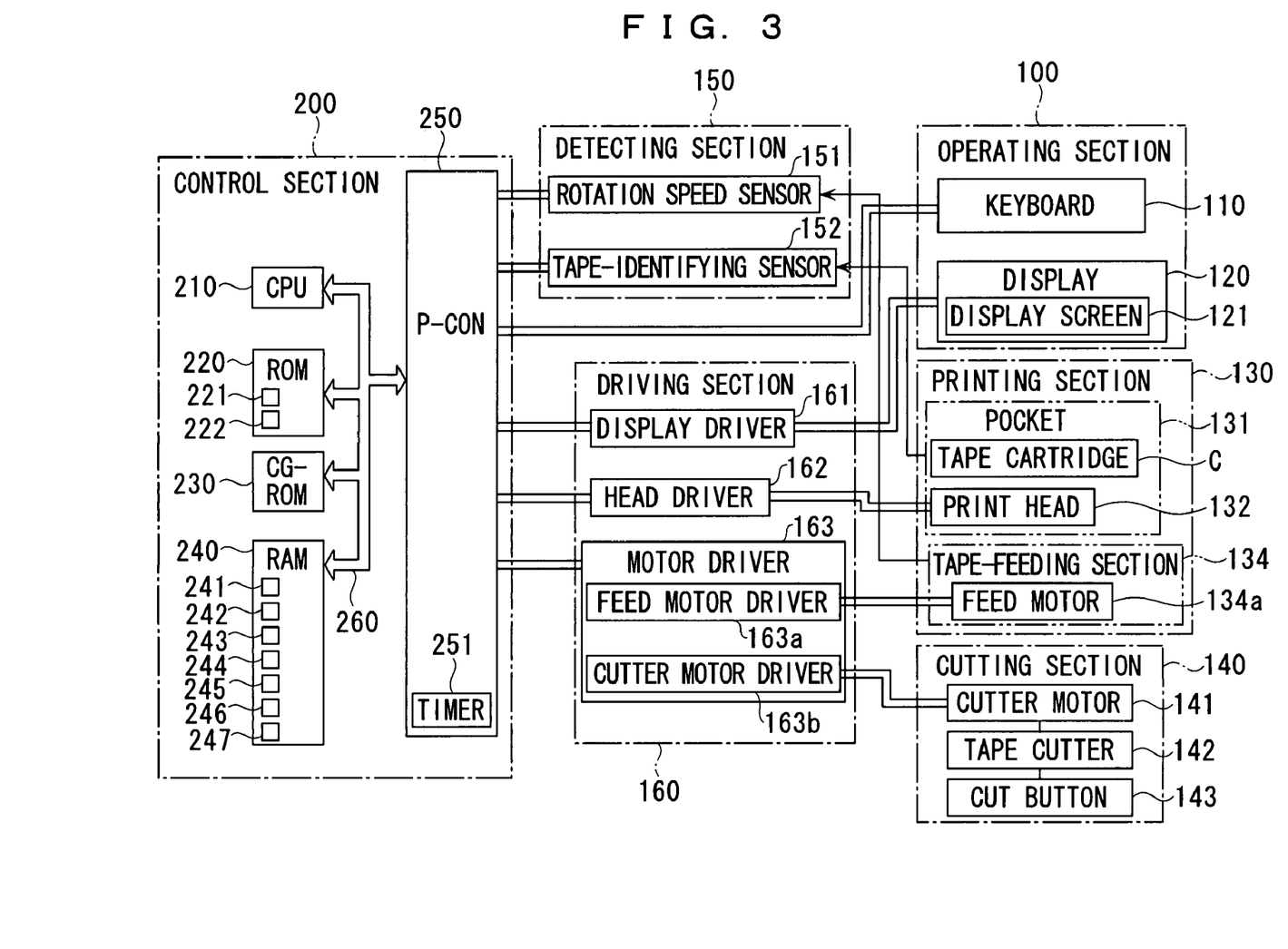
FIG. 3 is a control block diagram of the tape printing apparatus of FIG. 1.

Next, description of a control block diagram of the tape printing apparatus 1 will be made below with reference to FIG. 3. As shown in the figure, the tape printing apparatus 1 is composed of: an operating section 100 for interfacing with the user; a printing section 130 for performing printing on the print tape T; a cutting section 140 for cutting off the printed tape T; a detecting section 150 for performing detection with various sensors; a driving section 160 for driving each of circuits with various drivers; and a control section 200 for controlling each section of the tape printing apparatus 1.

Further, in the apparatus casing 2 as described above are accommodated a circuit board (not shown), in addition to the printing section 130, the cutting section 140, the detecting section 150. The circuit board has mounted thereon not only a power supply unit but also circuits including the driving section 160 and the control section 200, and it is connected to a battery such as a nicad battery detachable from an AC-adapter connecting port or the outside (not shown).

The operating section 100 is composed of the keyboard 110 and the display 120. The keyboard 110 is used for inputting various commands or data to the control section 200. The display 120 is rectangular with sides of approximately 6 cm in width (in X direction) and 4 cm in length (in Y direction), and includes therein the display screen 121 capable of displaying display image data of 96 dots×64 dots. The user uses the display screen to input data through the keyboard 110, form and edit print image data such as image data of character strings while viewing and confirming results thereof, and input various commands such as selection commands.

The printing section 130 is composed of the print head (thermal head) 132 and the tape-feeding section 134, and prints on the tape T of the tape cartridge C fit into the pocket 131.

The cutting section 140 is composed of the tape cutter 142, the cutter motor 141 for allowing the tape cutter to perform a cutting operation, and a cut button 143 for allowing the tape cutter to be operated manually in the case of an arbitrary-length printing. Further, the cutting section 140 allows the cutter motor 141 to be driven automatically in the case of a fixed-length printing. Accordingly, the tape printing apparatus 1 is to be operated in an automatic or manual manner depending on mode settings.

The detecting section 150 is composed of a rotation speed sensor 151 for detecting the rotation speed of the feed motor 134a and the above-described tape-identifying sensor 152.

The driving section 160 is composed of a display driver 161, a head driver 162, and a motor driver 163. The display driver 161 allows the display 120 of the operating section 100 to be driven in response to control signals outputted from the control section 200. Similarly, the head driver 162 allows the print head 132 of the printing section 130 to be driven in response to the direction from the control section 200. Further, the motor driver 163 is composed of a feed motor driver 163*a* for allowing the feed motor 134*a* of the printing section 130 to be driven and a cutter motor driver 163*b* for allowing the cutter motor 141 of the cutting section 140 to be driven. The motor driver 163 allows each of the above-described motors to be driven.

The control section 200 is composed of a CPU 210, a ROM 220, a character generator ROM (CG-ROM) 230, a RAM 240, and a peripheral control circuit (P-CON) 250, all of which are connected to one another through an internal bus 260.

The ROM 220 includes therein a control program area 221 for storing control programs processed by the CPU 210 and a control data area 222 for storing character-size sample data and alternative sample data as described hereinafter as well as control data containing a color conversion table, a character decoration table, etc. The CG-ROM 230 has stored therein font data such as characters (including numerals, symbols, graphics, etc.) provided in the tape printing apparatus 1, and outputs corresponding font data when receiving code data specifying the characters or the like.

The RAM 240 is to be battery-protected in case of power-off, and includes various flag and register groups 241, a text data area 242, a display-image data area 243, a print-image data area 244, a registered-image data area for drawing 245, a registered-image data area for external characters 246, and various buffer areas 247 including a character-developing buffer and a print buffer. Namely, the RAM is used as a work area for control processes.

The P-CON 250 has incorporated therein a logic circuit for complementing functions of the CPU 210 and handling interface signals with peripheral circuits through a gate array and a custom LSI. For example, a timer 251 is included in the P-CON 250 as a function thereof to perform various timing functions. Thus, the P-CON 250 is connected to the various sensors of the detecting section 150 and the keyboard 110, and receives into the internal bus 260 the above-described various detecting signals from the detecting section 150 or various commands and input data directed through the keyboard 110 either with or without processing the same. The P-CON 250 then outputs to the driving section 160 data or control signals outputted to the internal bus 260 from the CPU 210 or the like either with or without processing the same while interlocking with the CPU 210.

With the above-described configuration, the CPU 210 inputs various detecting signals, commands, data, etc. through the P-CON 250 in accordance with the control programs of the ROM 220, and then processes the font data from the CG-ROM 230 and various data of the RAM 240 to output the control signals to the driving section 160 through the P-CON 250. Accordingly, the CPU 210 controls the position for printing and the display of the display screen 121, and performs printing on the tape T under a given printing condition controlling print head 132. In other words, the CPU 210 controls the printing apparatus 1 as a whole.

Figure 4A:
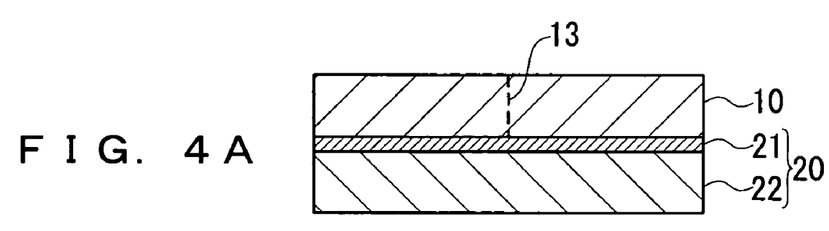
FIGS. 4A to 4C are cross-sectional drawings of a print tape according to an embodiment of the present invention.
Figure 4B:
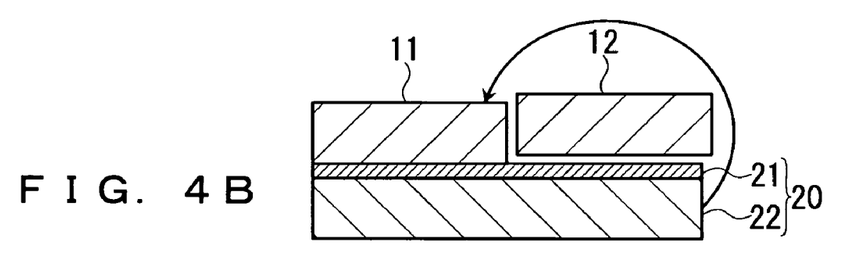
Figure 4C:
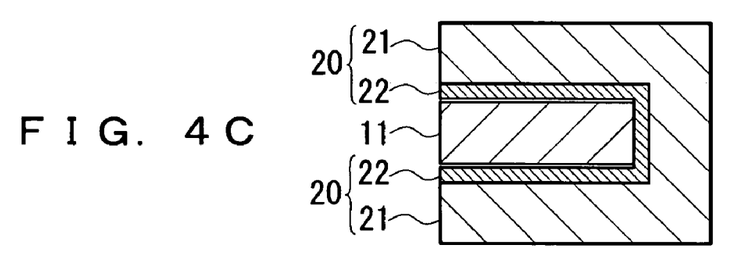
Figure 5:
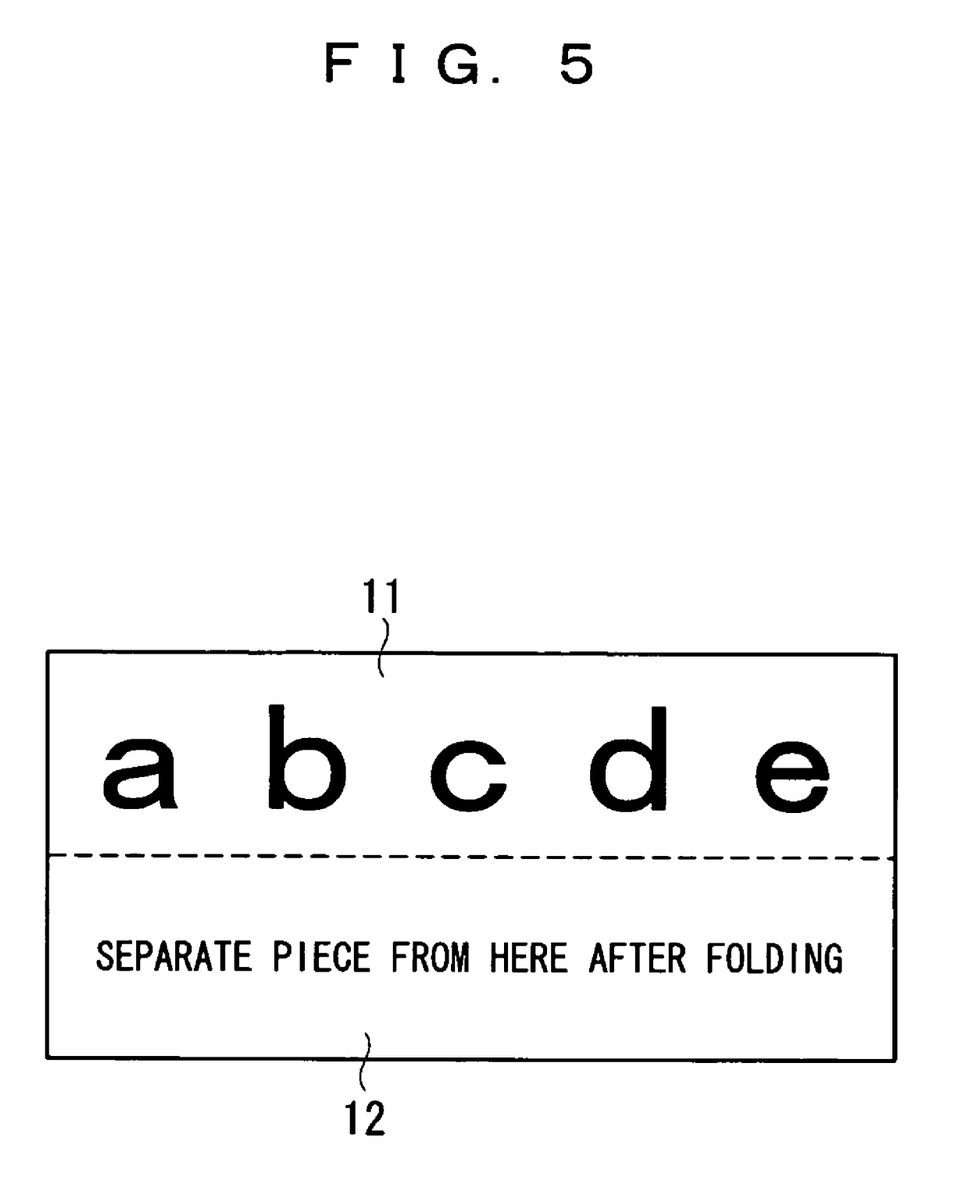
FIG. 5 is a plan view of the print tape of FIG. 4 after being cut.

In addition, description of the tape T used in the tape printing apparatus 1 of the present invention will be made below with reference to FIGS. 4A to 4C. As shown in FIG. 4A, the print tape T is composed of a recording tape layer 10 whose front face serves as a recording face, and of a transparent pseudo-laminate layer 20 affixed to the rear face of the recording tape layer 10. The front face of the recording tape layer 10 has a cut-line 13 formed along the tape-length direction generally at an intermediate position in a tape-width direction. With the cut-line 13, as shown in FIG. 4B, the recording tape layer 10 is configured such that a print-recording piece 11 as one substantially half-part of the recording tape layer and a separating piece 12 as the other substantially half-part of the recording tape layer are separated from each other. The separating piece 12 has previously printed thereon an operating instruction for performing a folding operation prior to a separating operation (see FIG. 5). Accordingly, the user is prevented from erroneously separating the separating piece or folding the pseudo-laminate layer. Further, the pseudo-laminate layer 20 has a laminating adhesive layer 21 formed on the front-face side thereof (i.e., the front-face side referred herein corresponds to the rear-face side of the recording tape layer 10), and a transparent tape layer 22 formed on the rear-face side thereof (i.e., the rear-face side referred herein corresponds to the rear-face side of the tape T). FIG. 4 shows a state of the tape T where the transparent tape layer 22 is affixed to the print-recording piece 11 side after separation of the separating piece 12.

Figure 6:
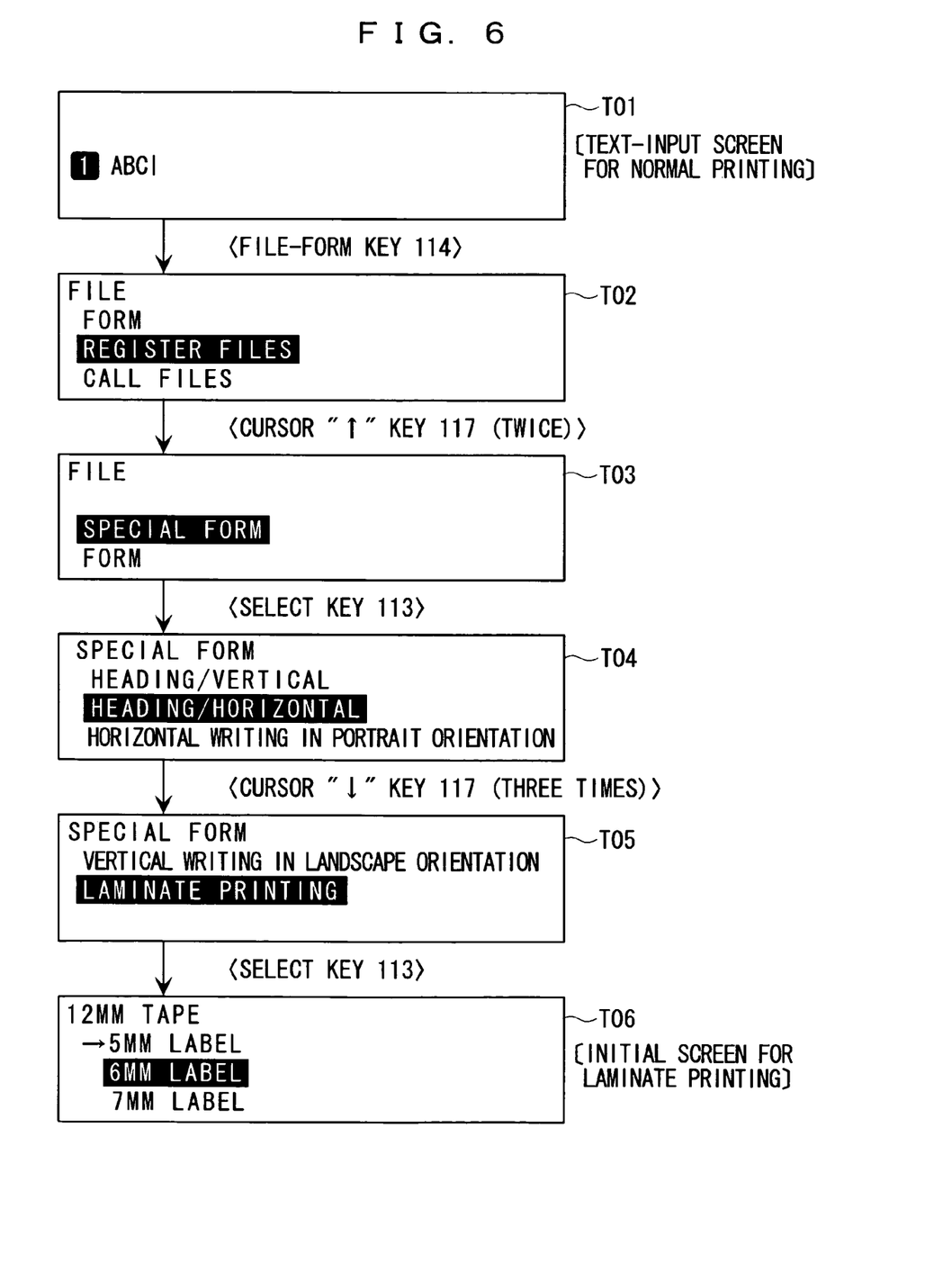
FIG. 6 is an operating instruction on a display screen showing an example of laminate printing.

The function of laminate printing as a feature of the present invention will now be described below. To start the function of laminate printing, as shown in FIG. 6, while a text-input screen for the normal printing appears (screen T01: "screen" will be hereinafter omitted), the user is first required to press a file-form key 114, and then operate a cursor "↑" key 117 on the following screen (T02) and select a special form to press a select key 113 (T03). Subsequently, on a special form screen (T04), the user is required to operate the cursor "↓" key 117 and select laminate printing (T05) to press the select key 113, and then an initial screen (T06) of laminate printing for selecting a tape width of a folded tape appears.

In this case, the tape-identifying sensor 152 provided in the tape printing apparatus 1 identifies from the tape cartridge C fit into the apparatus that the tape width of the tape T is 12 mm long. Accordingly, on the initial screen (T06) of laminate printing are displayed signs of: "5 mm label" where the folded tape width is 5 mm long; "6 mm label" where the folded tape width is 6 mm long; and "7 mm label" where the folded tape width is 7 mm long, with regard to the 12 mm tape width. Note that the signs of "5 mm label," "6 mm label," and "7 mm label" refer to types of a "rear-face wind folding," a "normal folding," and an "insufficient folding," respectively.

Next, flow of laminate printing will be specifically described below. Note that the tape printing apparatus 1 has installed therein the tape T having 12 mm tape width. Following descriptions will be made in the order of a first embodiment and a second embodiment. The first embodiment refers to the insufficient folding in which the tape width of a folded tape is greater than one-half of the tape width of a pre-folded tape. The second embodiment refers to the rear-face wind folding in which the tape width of a folded tape is smaller than one-half of the tape width of a pre-folded tape.

Figure 7:
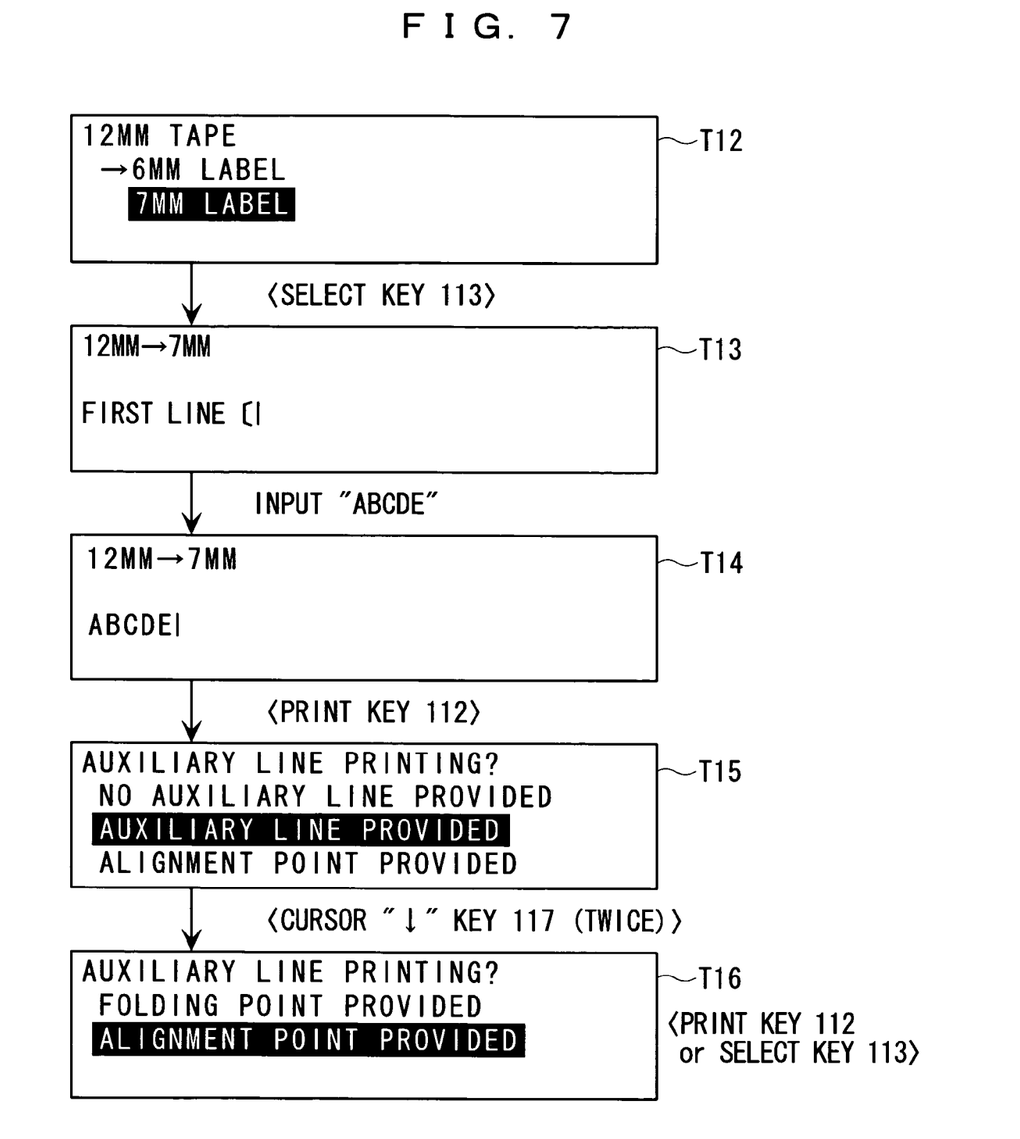
FIG. 7 is an operating instruction on a display screen according to a first embodiment of the present invention.
Figure 8A:
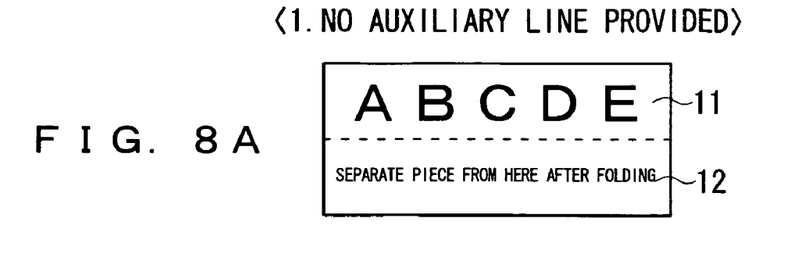
FIGS. 8A to 8D are plan views of a print tape after being cut, each showing a type of auxiliary lines according to an embodiment of the present invention.
Figure 8B:
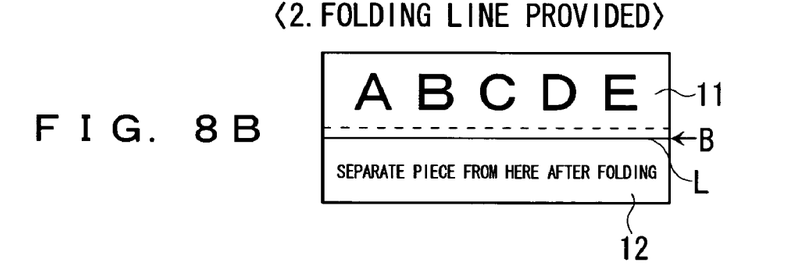
Figure 8C:
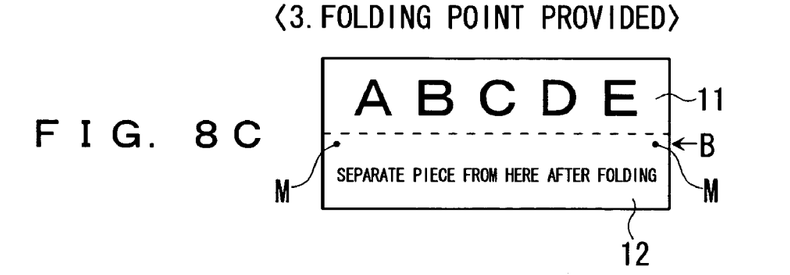
Figure 8D:
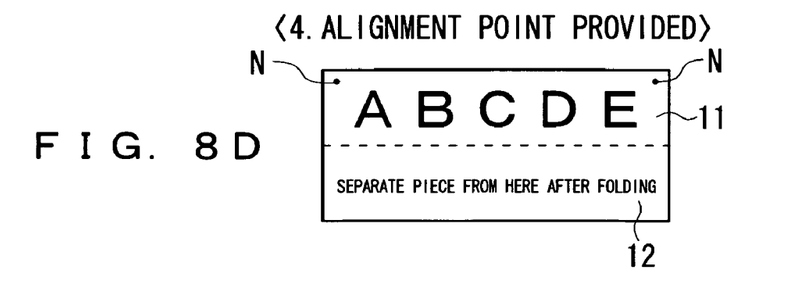

First, description of the first embodiment in which the insufficient folding is performed will be made with reference to FIG. 7. On the initial screen for laminate printing as described above, if the user operates the cursor "↓" key 117, displays the "7 mm label" in reverse video (T12), and presses the select key 113, a character-input screen (T13) appears.

The tape printing apparatus 1 defines not only a folding-line position B (see FIG. 9A) but also a print-width range P (also see FIG. 9A) on the recording face which will be specifically described below, provided that the tape width of a folded tape is the "7 mm label." An input guide (the segment of "FIRST LINE [" displayed on the character-input screen (T13) indicates only the number of rows to which characters can be inputted based on the defined print-width range P.

On the character-input screen displayed, characters of "ABCDE" are then inputted (T14). Note that if the character-mode key 115 (see FIG. 2) or the paragraph-style key 116 (also see FIG. 2) is pressed at that time, the user is allowed to decorate the characters by using boldface, italics, or the like and setting "large" or "small" character sizes.

After the characters of "ABCDE" are inputted, if the user presses the print key 112, an auxiliary-line selection screen (T15) appears. The screen allows the user to judge the necessity of an auxiliary-line printing and select types thereof. On the auxiliary-line printing screen, the user selects any one of the alternatives of (1) NO AUXILIARY LINE PROVIDED, (2) FOLDING LINE PROVIDED, (3) FOLDING POINT PROVIDED, and (4) ALIGNMENT POINT PROVIDED. Note that in the case of the insufficient folding where the folding-line position B is positioned on the separating piece 12, the alternatives of (2) FOLDING LINE PROVIDED and (3) FOLDING POINT PROVIDED may be in a disabled state.

FIG. 8 show each type of auxiliary lines. If the user selects (1) NO AUXILIARY LINE PROVIDED, the characters are printed on the recording face as they are (FIG. 8A). If the user selects (2) FOLDING LINE PROVIDED, a linear folding-line L is printed at the folding-line position B (FIG. 8B). If the user selects (3) FOLIND-POINT PROVIDED, folding-points (dots) M, M are printed at two collinear spots on the folding-line position B (FIG. 8C). If the user selects (4) ALIGNMENT POINT PROVIDED, alignment-points (dots) N, N are printed at two collinear spots with which the folding end of the folded pseudo-laminate layer 20 (see FIG. 4C) is aligned (FIG. 8D). Note that if the user selects (4), it can be made possible to combine (4) with either (2) or (3). In addition, the folding-line L and the folding-points M, M can be printed on the recording face of the separating piece 12, which is not included in the print-width range P.

Let it be assumed that the alignment-points N, N are printed in the first embodiment. On the selection screen for the auxiliary-line printing (FIG. 7 (T15)), if the user operates the cursor "⇓" key 117, displays (4) ALIGNMENT POINT PROVIDED in reverse video (FIG. 7 (T16)), and presses the print key 112 or the select key 113, the tape printing apparatus 1 defines the print size of the inputted characters of "ABCDE" based on the defined print-width range P, and then allows the characters to be centered in the tape-width direction with regard to the recording face of the recording tape layer 10 of the tape T. Following the procedure, the apparatus starts printing. Accordingly, the user can save labor of designating the size of the characters in consideration of the print-width range P.

Figure 9A:
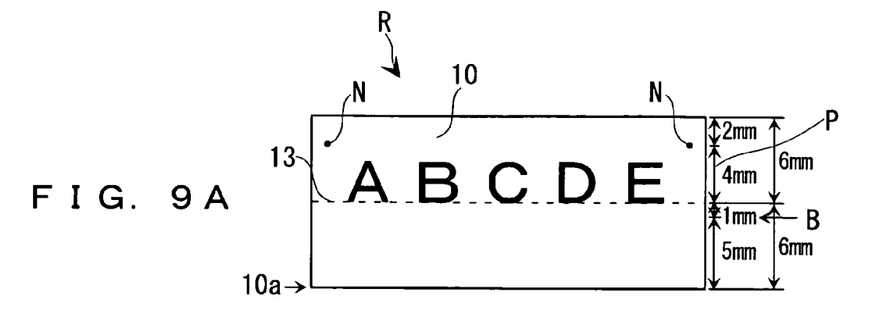
FIGS. 9A to 9D are perspective views, each showing a procedure for forming a print tape serving as a laminate tape according to a first embodiment of the present invention.

Further, flow of folding involving the insufficient folding will be described below with reference to FIGS. 9A to 9D. A label R in each of the figures refers to a label cut into a desired length in which the characters of "ABCDE" and the auxiliary line as described in the first embodiment are printed on the recording face of the recording tape layer 10 of the tape T. In the first embodiment, since the tape width of the folded tape is set to 7 mm, the folding-line position B is set at a distance of 5 mm from the folding end 10a (bottom end in the figure) of the recording tape layer 10, and the alignment-points N, N are printed at a distance of 10 mm from the folding end 10a of the recording tape layer 10 (FIG. 9A).

Figure 9B:
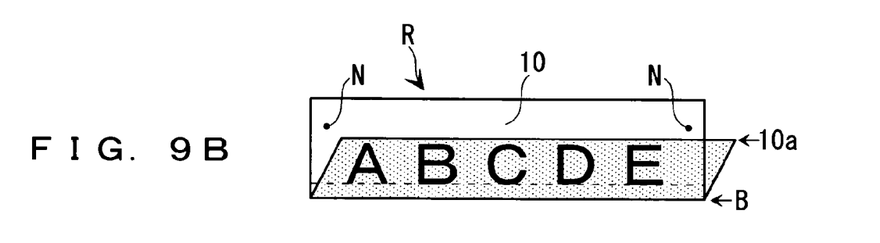
Figure 9C:
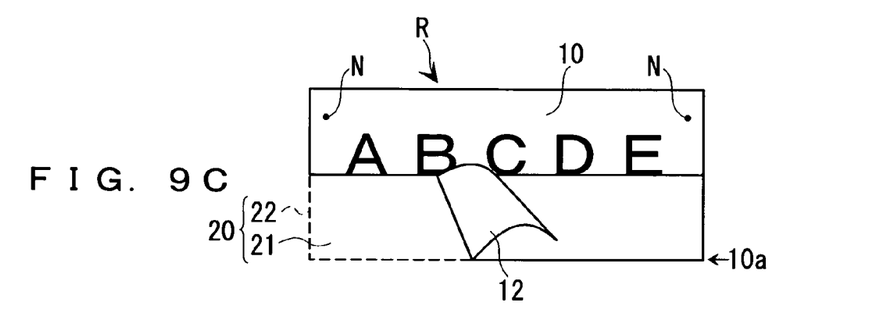
Figure 9D:
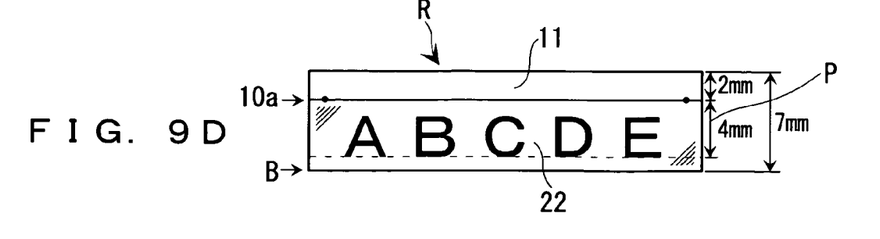

First, the folding end 10a of the recording tape layer 10 is folded in such a manner as to align with the alignment-points N, N to make a habitual folding line at the folding-line position B (FIG. 9B). Next, the folded label R is restored to an initial state, and substantially the half-part serving as the separating piece 12 of the recording tape layer 10 is separated from the laminating adhesive layer 21 of the pseudo-laminate layer 20 (FIG. 9C). Then, the pseudo-laminate layer 20 is folded again along the habitual folding line previously made, and the exposed laminating adhesive layer 21 is affixed to the recording face of the print recording piece 11. As a result, it is made possible to easily form the label R having the 7 mm tape width in which each of the characters of "ABCDE" printed on the print recording piece 11 of the recording face of the recording tape layer 10 is laminated with the transparent tape layer 22 of the pseudo-laminate layer 20 (FIG. 9D).

Figure 10:
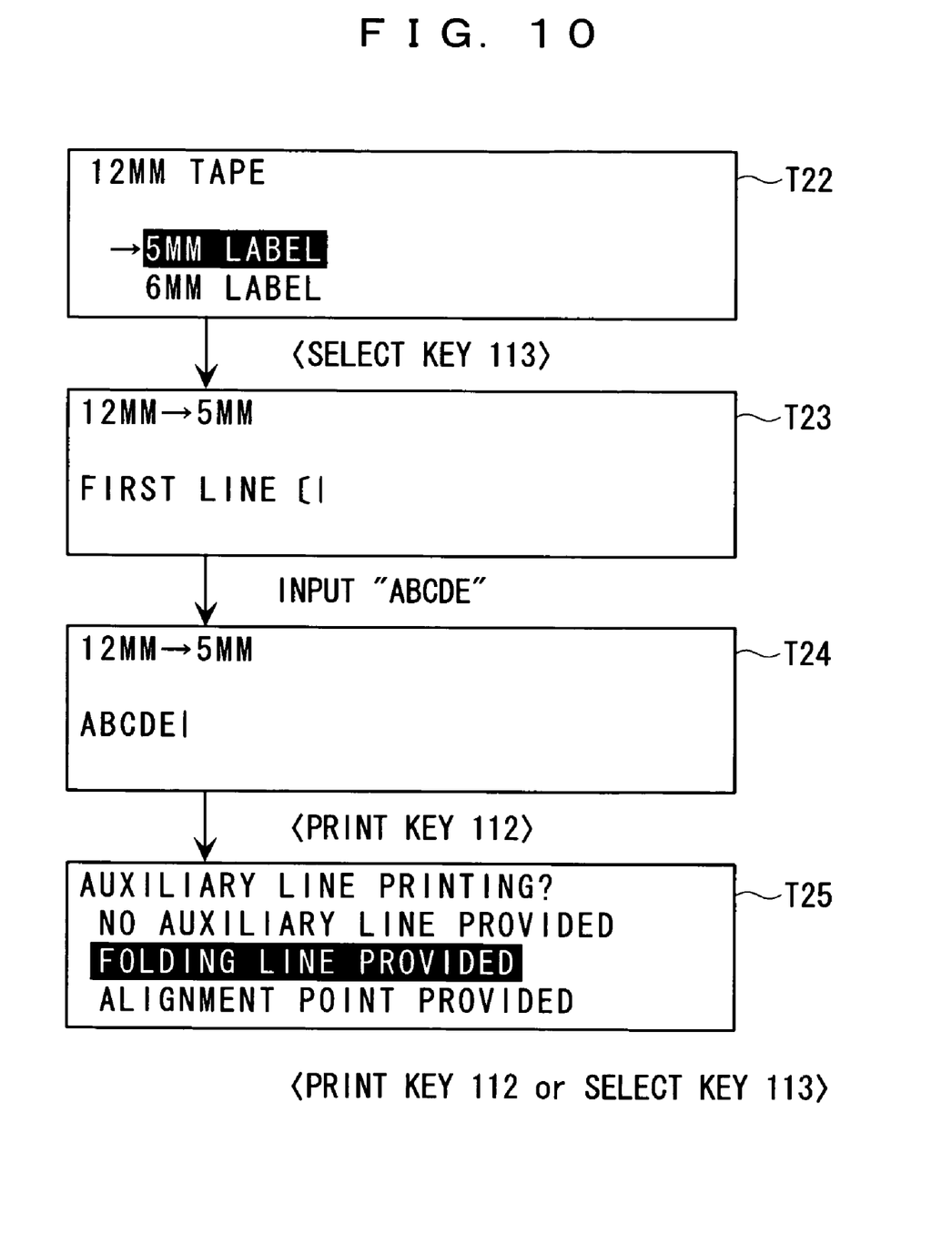
FIG. 10 is an operating instruction on a display screen according to a second embodiment of the present invention.

Next, description of the second embodiment in which the rear-face wind folding is performed will be made with reference to FIG. 10. As in the case of the first embodiment, if the user operates the cursor "⇑" key 117 on the initial screen for laminate printing as described above, displays herein the "5 mm label" in reverse video (T22), and presses the select key 113, a character-input screen (T23) appears.

The tape printing apparatus 1 defines not only a folding-line position B (see FIG. 11A) but also a print-width range P (also see FIG. 11A) on the recording face which will be specifically described below, provided that the tape width of a folded tape is the "5 mm label." Further, an input guide indicates only the number of rows to which characters can be inputted based on the defined print-width range P.

On the character-input screen displayed, characters of "ABCDE" are then inputted (T24). Note that, as in the case of the first embodiment, if the character-mode key 115 (see FIG. 2) or the paragraph-style key 116 (also see FIG. 2) is pressed at that time, the user is allowed to decorate the characters by using boldface, italics, or the like and setting "large" or "small" character sizes.

After the characters of "ABCDE" are inputted, if the user presses the print key 112, an auxiliary-line selection screen (T25) appears. The screen allows the user to judge the necessity of an auxiliary-line printing and select types thereof. On the auxiliary-line printing screen, the user selects any one of the alternatives of (1) NO AUXILIARY LINE PROVIDED, (2) FOLDING LINE PROVIDED, (3) FOLDING POINT PROVIDED, and (4) ALIGNMENT POINT PROVIDED.

Let it be assumed that a folding-line is printed in the second embodiment. Since (2) FOLDING LINE PROVIDED is displayed by default in reverse video on the auxiliary-line selection screen (T25), if the user presses the print key 112 or the select key 113, the printing apparatus 1 starts printing on the recording face of the recording tape layer 10 of the tape T. Note that, as in the case of the first embodiment, the tape printing apparatus 1 defines the print size of the inputted characters of "ABCDE" based on the defined print-width range P and allows the characters to be centered in the tape-width direction with regard to the recording face of the recording tape layer 10 of the tape T, prior to the printing thereof. Accordingly, the user can save labor of designating the size of the characters in consideration of the print-width range P.

Next, flow of folding involving the rear-face wind folding will be described below with reference to FIGS. 11A to 11E.

A label R in each of the figures refers to a label cut into a desired length in which the characters of "ABCDE" and the auxiliary line as described in the second embodiment are printed on the recording face of the recording tape layer 10 of the tape T.

Figure 11A:
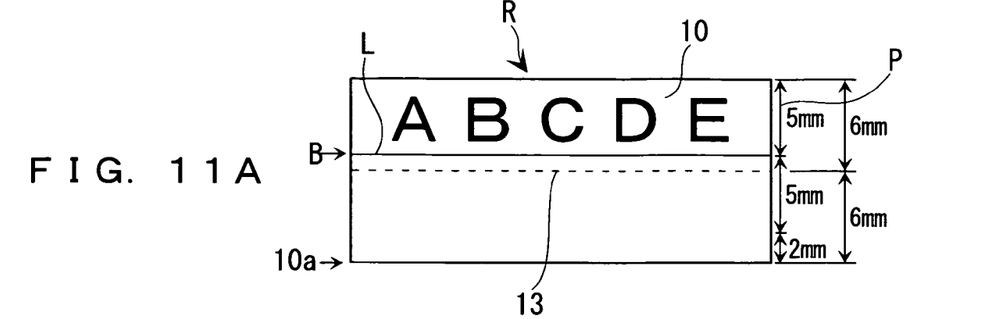
FIGS. 11A to 11E are perspective views, each showing a procedure for forming a print tape serving as a laminate tape according to a second embodiment of the present invention.

In the second embodiment, since the tape width of the folded tape is set to 5 mm, the folding-line position B is set at a distance of 7 mm from the folding end 10a of the recording tape layer 10, and the folding-line L is printed at a distance of 7 mm from the folding end 10a of the recording tape layer 10 of the tape T (FIG. 11A).

Figure 11B:
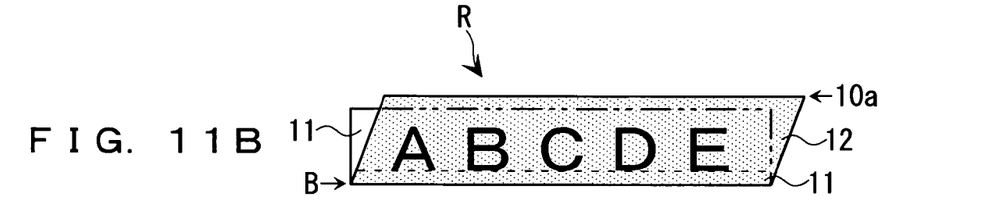
Figure 11C:
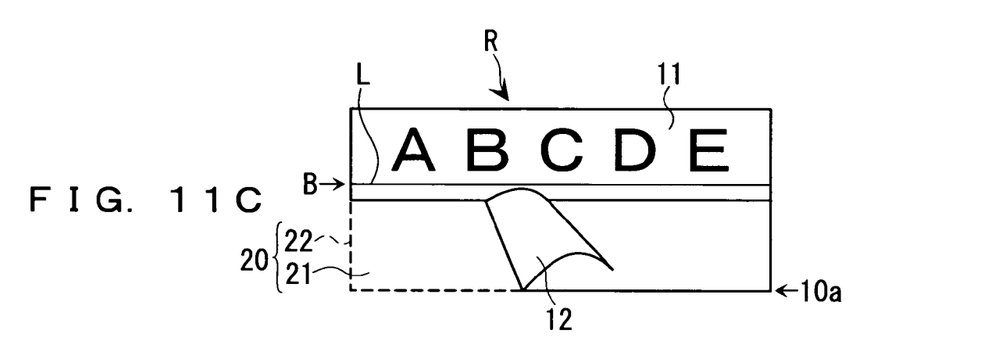

First, part of the separating piece 12 or the print recording piece 11 of the recording tape layer 10 is folded along the folding-line L to make a habitual folding line thereat (FIG. 11B). Next, the folded label R is restored to an initial state, and substantially the half-part serving as the separating piece 12 is separated from the laminating adhesive layer 21 of the pseudo-laminate layer 20 (FIG. 11C).

Figure 11D:
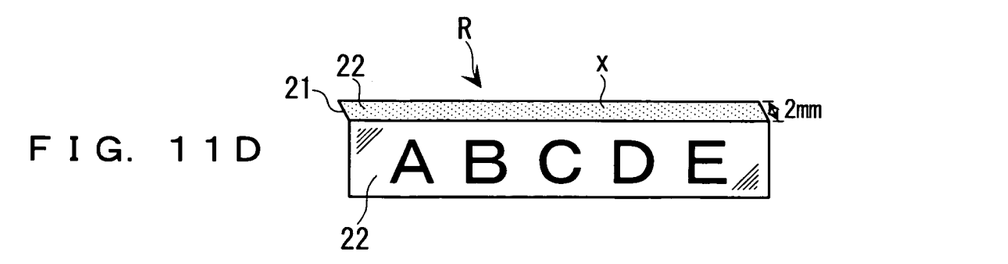
Figure 11E:
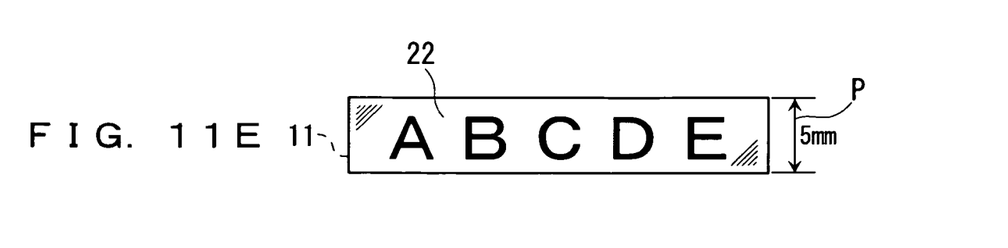

Then, the folding is made along the folding-line L guided by the habitual folding line previously made, and the exposed laminating adhesive layer 21 on the front face of the pseudo-laminate layer 20 is affixed to the recording face of the print recording piece 11 of the recording tape layer 10 (FIG. 11D). In addition, an unaffixed part x where the laminating adhesive layer 21 is exposed is affixed to the rear face of the label R. As a result, it is made possible to easily form the label R having the 5 mm tape width in which each of the characters of "ABCDE" printed on the print recording piece 11 of the recording face of the recording tape layer 10 is laminated with the transparent tape layer 22 of the pseudo-laminate layer 20 (FIG. 11E). Note that if the user selects the tape width causing the rear-face wind folding, the folding base of the unaffixed part x where the laminating adhesive layer 21 is exposed, i.e., the position of the end of the print recording piece 11 with which the folding base of the unaffixed part x is aligned.

Figure 12A:
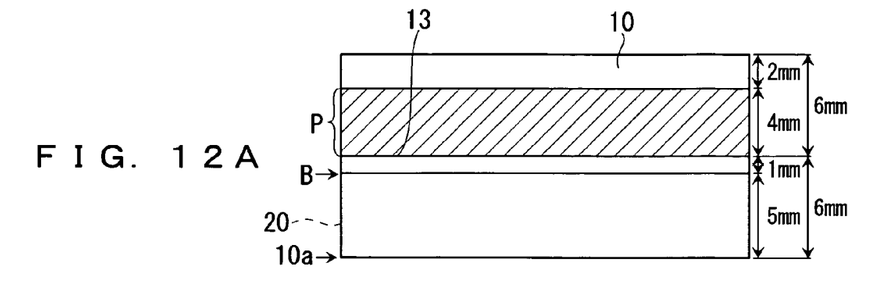
FIGS. 12A to 12C are plan views of a print tape after being cut, each showing a print range according to an embodiment of the present invention.
Figure 12B:
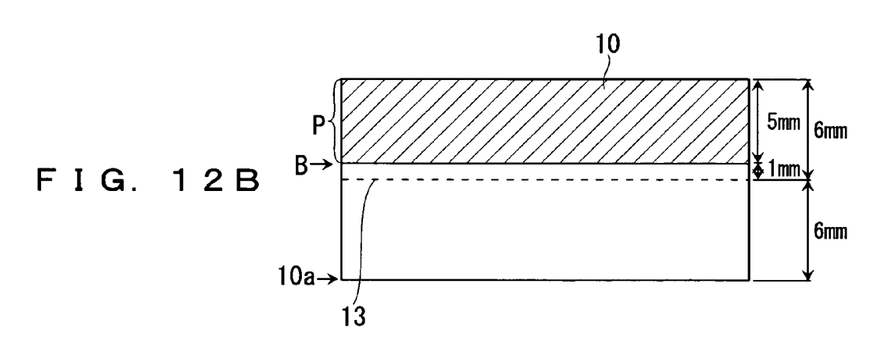
Figure 12C:
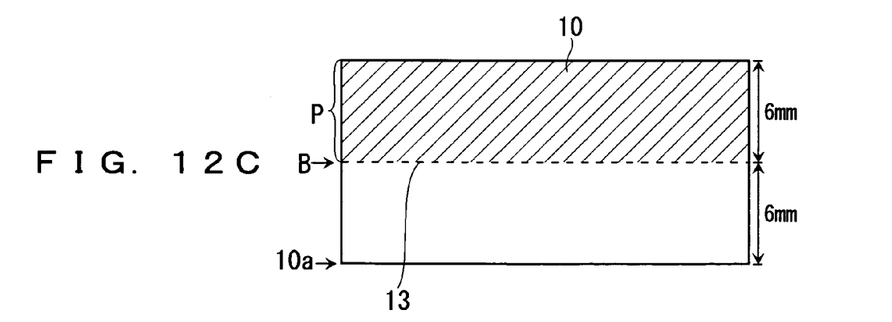

Description of defining the above-described print-width range P will now be made with reference to FIGS. 12A to 12C.

The printing apparatus 1 enables to define the folding-line position B based on the tape width of the folded tape inputted and to define the print-width range P based on the defined folding-line position B. In a case where the user defines the tape width of the folded tape as 7 mm with regard to the tape T having a width of 12 mm, it results in the insufficient folding in which the folding-line position B is set at a distance of 5 mm from the folding end 10a of the recording tape layer 10 (FIG. 12A). In this case, the area of 4 mm between the cut line 13 and the folding end of the folded pseudo-laminate layer 20, i.e., the position 10 mm away from the folding end 10a of the recording tape layer 10 is defined as the print-width range P (FIG. 12A).

In a case where the user defines the tape width of the folded tape as 5 mm with regard to the tape T having a width of 12 mm, it results in the rear-face wind folding in which the folding position B is set at a distance of 7 mm from the folding end 10a of the recording tape layer 10. In this case, the area of 5 mm between the end of the print recording piece 11 around which the pseudo-laminate layer turns (the position 12 mm away from the folding end 10a of the recording tape layer 10) and the folding base of the print recording piece 11, i.e., the folding-line position B is defined as the print-width range P (FIG. 12B). Since the print-width range P is defined based on the folding-line position in this manner, it is possible to prevent the characters from being partially printed on a non-laminated part and to prevent the characters from being only partially folded in forming a print tape serving as a laminate tape with an attractive appearance.

Note that the area in which the characters are fully laminated with the transparent tape layer 22 of the pseudo-laminate layer 20 is defined as the print-width range P in the present embodiment. Alternatively, the print-width range P may include the area which is not laminated. It is thus possible to further extend the range of the tape width of the folded tape in response to the tape width of the tape T before being folded.

Finally, description of the normal folding in which the tape width of a folded tape is one-half of the tape width of a pre-folded tape will be made briefly. If the user defines the tape width of the folded tape as 6 mm with regard to the tape T having a width of 12 mm, the folding-line position B is set to the position of the cut line 13, i.e., at a distance of 6 mm from the folding-end 10a of the recording tape layer 10. The area between the folding-line position B and the position 12 mm away from the folding end 10a of the recording tape layer 10 is defined as the print-width range P (see FIG. 12C). Then, the screen of laminate printing changes as in the case of the first embodiment and the second embodiment (see FIG. 7 or FIG. 10). Note that the user may perform printing without displaying the auxiliary-line selection screen in this case (see T15 or T25).

Since the tape printing apparatus 1 defines the print-width range P based on the defined folding-line position B of the pseudo-laminate layer 20 and prints the characters and the folding-line L in the defined print-width range P, it is possible to prevent the characters from being partially printed on a non-laminated part or to prevent the characters from being only partially folded in forming a print tape serving as a laminate tape with an attractive appearance.

The tape printing apparatus 1 may be configured such that it comprises a detecting means for detecting whether or not the tape T fit into the tape cartridge C is a print tape for lamination. In a case where the print tape for lamination has been fit into the tape cartridge C, the screen for setting the character size etc. may display the setting of tape width of the folded-tape in an automatic manner.

It is further understood by those skilled in the art that the foregoing is the preferred embodiment of the present invention, and that various changes and modifications may be made without departing from the spirit and scope thereof.

What is claimed is:

1. A tape printing apparatus for performing printing on a print tape which includes:

a recording tape layer formed of a print recording piece in one substantially half-part whose front face serves as a recording face and of a separating piece in the other substantially half-part, both of which are divided by a front cut-line formed at an intermediate position in a tape-width direction; and a transparent pseudo-laminate layer affixed to a rear face of the recording tape layer and having a laminating adhesive layer on a front-face side thereof and a transparent tape layer on a rear-face side thereof, wherein the separating-piece side of the pseudo-laminate layer is allowed to serve as a laminate tape for the recording face when folded and affixed to the front face of the print recording piece after separation of the separating piece, the tape printing apparatus comprising:

an inputting means for inputting a character to be printed on the recording face;

a folding-line defining means for defining a folding-line position of the pseudo-laminate layer;

a width-range defining means for defining a print-width range of the recording face based on the defined folding-line position; and a printing means for printing the character in the defined print-width range.

2. The tape printing apparatus according to claim 1, wherein
the print tape is allowed to constitute: a normal folding in which the tape width of a folded tape is one-half of the tape width of a pre-folded tape; an insufficient folding in which the tape width of a folded tape is greater than one-half of the tape width of a pre-folded tape; and a rear-face wind folding in which the tape width of a folded tape is smaller than one-half of the tape width of a pre-folded tape, and
the folding-line defining means defines a folding-line position of the pseudo-laminate layer based on the designated tape width of the folded tape.

3. The tape printing apparatus according to claim 2, wherein,
when the folding-line position causing the insufficient folding is defined, the printing means prints on the recording face not only a character but also an end mark indicative of the end of the folded pseudo-laminate layer.

4. The tape printing apparatus according to claim 3, wherein
the end mark is composed of a dot printed away from the character.

5. The tape printing apparatus according to claim 2, wherein,
when the folding-line position causing the insufficient folding is defined, the printing means prints on the front face of the separating piece not only a character but also a folding-line mark indicative of the folding-line position.

6. The tape printing apparatus according to claim 2, wherein,
when the folding-line position causing the rear-face wind folding is defined, the printing means prints on the recording face not only a character but also a folding-line mark indicative of the folding-line position.

7. The tape printing apparatus according to claim 5, wherein the folding-line mark is composed of a line extending in a traveling direction of the print tape.

8. The tape printing apparatus according to claim 2, wherein,
when the folding-line position causing the insufficient folding is defined, the width-range defining means defines as the print-width range the area between the cut-line position and the end of the folded pseudo-laminate layer.

9. The tape printing apparatus according to claim 2, wherein,
when the folding-line position causing the rear-face wind folding is defined, the width-range defining means defines as the print-width range the area between an end of the print recording piece around which the pseudo-laminate layer turns and a folding base of the folded print recording piece.

10. The tape printing apparatus according to claim 1, further comprising a size-defining means for defining a print size of a character in conformity with the print-width range.

11. The tape printing apparatus according to claim 1, wherein the printing means prints on the separating piece an operating instruction for a laminate operation.

12. The tape printing apparatus according to claim 11, wherein the operating instruction includes an instruction for performing a folding operation prior to a separating operation.

13. A tape printing method in a tape printing apparatus for performing printing on a print tape which includes:
a recording tape layer formed of a print recording piece in one substantially half-part whose front face serves as a recording face and of a separating piece in the other substantially half-part, both of which are divided by a front cut-line formed at an intermediate position in a tape-width direction; and
a transparent pseudo-laminate layer affixed to a rear face of the recording tape layer and having a laminating adhesive layer on a front-face side thereof and a transparent tape layer on a rear-face side thereof, wherein
the separating-piece side of the pseudo-laminate layer is allowed to serve as a laminate tape for the recording face when folded and affixed to the front face of the print recording piece after separation of the separating piece,
the tape printing method comprising:
an inputting step of inputting a character to be printed on the recording face;
a folding-line defining step of defining a folding-line position of the pseudo-laminate layer;
a width-range defining step of defining a print-width range of the recording face based on the defined folding-line position; and
a printing step of printing the character in the defined print-width range.

* * * * *